(12) United States Patent
Roux

(10) Patent No.: US 7,386,425 B1
(45) Date of Patent: Jun. 10, 2008

(54) METHOD AND SYSTEM FOR DISTINGUISHING EFFECTS DUE TO BIFURCATION FROM EFFECTS DUE TO DESIGN VARIABLE CHANGES IN FINITE ELEMENT ANALYSIS

(75) Inventor: Willem Roux, Livermore, CA (US)

(73) Assignee: Livermore Software Technology Corp., Livermore, CA (US)

( * ) Notice: Subject to any disclaimer, the term of this patent is extended or adjusted under 35 U.S.C. 154(b) by 645 days.

(21) Appl. No.: 10/700,217

(22) Filed: Nov. 3, 2003

(51) Int. Cl.
*G06F 17/50* (2006.01)

(52) U.S. Cl. .......................................................... 703/1

(58) Field of Classification Search ................ 703/1, 703/2
See application file for complete search history.

(56) References Cited

U.S. PATENT DOCUMENTS

| | | | |
|---|---|---|---|
| 6,212,486 B1 * | 4/2001 | Huang et al. ................... | 703/7 |
| 6,813,749 B2 * | 11/2004 | Rassaian ......................... | 716/4 |
| 6,879,087 B2 * | 4/2005 | Moler .......................... | 310/328 |
| 7,006,947 B2 * | 2/2006 | Tryon et al. ................. | 702/183 |
| 2004/0194051 A1 * | 9/2004 | Croft .............................. | 716/20 |

OTHER PUBLICATIONS

Venkataraman (Modeling, Analyzing, and Optimization of Cylindrical Stiffened Panels for Reusable Launch Vehicle Structures, 1999); pp. 1-209).*

J.P. Bardet, Finite Element Analysis of Rockburst as surface instability, 1989.*

Clemens-August Thole, Liquan Mei, Reasons for scatter in crash simulation results, 4th European LS-DYNA Conference, May 22, 2003, pp. B-III-11-20, Germany.

Willem Roux, Nielen Stander, Probabilistic Analysis with LS-OPT, Nichtlineare Optimierung und Stochastische Analysen, Jun. 27, 2003, Stuttgart, Germany.

Willem Roux, Heiner Mullerschon, Franf Gunther, Optimization and crash development of commercial vehicles at DaimlerChrysler, LS-DYNA Conference Proceedings, Oct. 14, 2003, Japan.

\* cited by examiner

*Primary Examiner*—Paul L Rodriguez
*Assistant Examiner*—Andre Pierre-Louis
(74) *Attorney, Agent, or Firm*—Roger Chu

(57) ABSTRACT

A method, a software product and a system for distinguishing effects due to bifurcation from effects due to design variable changes in finite element analysis is disclosed. According to one aspect of the invention, 1) a plurality of design experiments is analyzed with finite element analysis (FEA) software; 2) a metamodel is constructed from the FEA responses using the least squares fitting technique; 3) any FEA response that is not predicted by the metamodel is classified as outlier, which is the high likelihood candidate for bifurcation; and 4) verification of the bifurcation is then to be confirmed. The method is implemented in a design and probabilistic analysis software product.

11 Claims, 7 Drawing Sheets

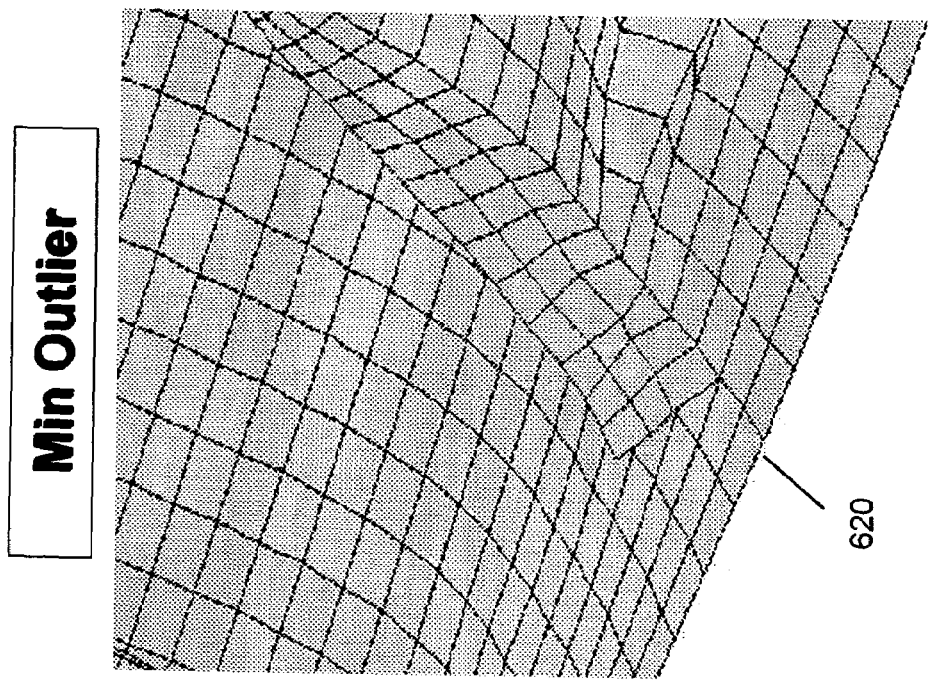
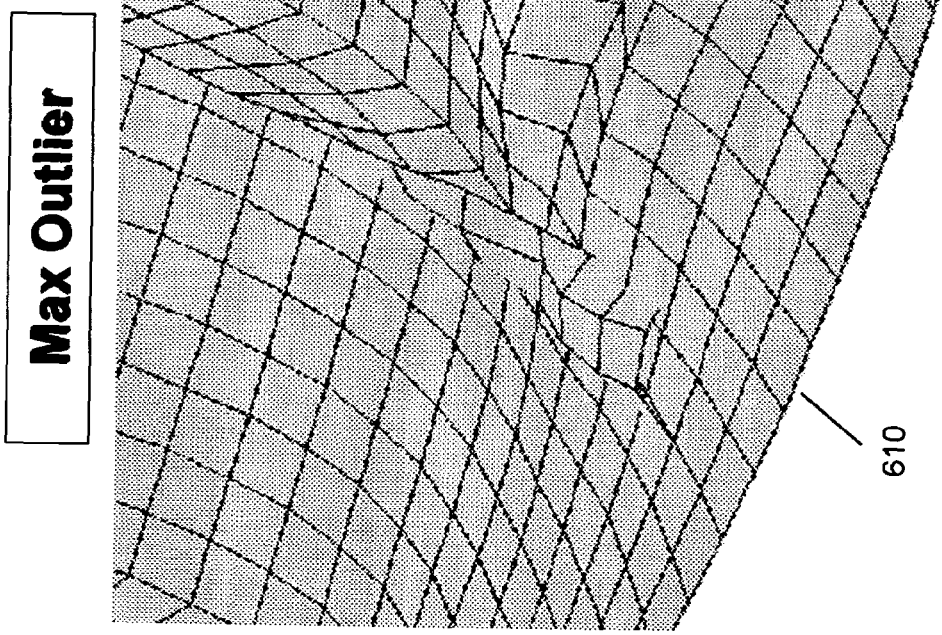
FIG. 6

METHOD AND SYSTEM FOR DISTINGUISHING EFFECTS DUE TO BIFURCATION FROM EFFECTS DUE TO DESIGN VARIABLE CHANGES IN FINITE ELEMENT ANALYSIS

BACKGROUND OF THE INVENTION

1. Field of the Invention

The present invention generally relates to method, system and software product used in structural design using finite element analysis, more particularly to distinguish effects due to bifurcation from effects due to design variable changes in a structural design study.

2. Description of the Related Art

Finite element analysis (FEA) is a computerized method widely used in industry to model and solve engineering problems relating to complex systems. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

FEA had it beginnings as a method for structural analysis, but today is routinely used in the design of motors, generators, magnetic resonance imaging systems, aircraft engine ignition systems, circuit breakers and transformers, to name but a few; its techniques are used to analyze stress, temperature, molecular structure, electromagnetic fields, car crash, metal stamping, physical forces, etc. in all sorts of physical systems. It has become a standard part of the design cycle for numerous products which are not easily analyzed by other methods.

FEA is becoming increasingly popular with automobile manufacturers for optimizing both the aerodynamic performance and structural integrity of vehicles. Similarly, aircraft manufacturers rely upon FEA to predict airplane performance long before the first prototype is built. Rational design of semiconductor electronic devices is possible with Finite Element Analysis of the electrodynamics, diffusion, and thermodynamics involved in this situation. FEA is utilized to characterize ocean currents and distribution of contaminants. FEA is being applied increasingly to analysis of the production and performance of such consumer goods as ovens, blenders, lighting facilities and many plastic products. In fact, FEA has been employed in as many diverse fields as can be brought to mind, including plastics mold design, modeling of nuclear reactors, analysis of the spot welding process, microwave antenna design, simulating of car crash and biomedical applications such as the design of prosthetic limbs. In short, FEA is utilized to expedite design, maximize productivity and efficiency, and optimize product performance in virtually every stratum of light and heavy industry. This often occurs long before the first prototype is ever developed.

Generally, FEA begins by generating a finite element model of a system. In this model, a subject structure is reduced into a number of node points which are connected together to form finite elements. Governing equations of motion are written in a discrete form, where the motions of each node point are the unknown part of the solution. A simulated load or other influence is applied to the system and the resulting effect is analyzed using well known mathematical methods.

To design a structure, engineers study the effects of modifying certain design variables (e.g., the thickness of a plate, the cross-section area of a beam, or angle of loading direction). Design methods can use metamodels to predict the structural responses. The metamodel is constructed using the FEA solutions obtained for a selected design cases via a number of mathematical techniques, such as least squares fitting, Taylor series expansion, neural nets and Kringing approximations. In particular, the metamodel created with least squares fitting is called a response surface. Engineers can select an improved design using the metamodels. Today, not only has metamodels been applied to simple structures, it has also been used for very complicated, highly non-linear, impact analysis (e.g., car crash simulation). In theory, the design study can be performed without much difficulty. However, when there is a bifurcation in the FEA solution, it creates a huge problem for the design study due to multiple valid solutions for a given set of design variables. The most common bifurcation in structural design is an instability called buckling.

Buckling is an instability occurring when the loading of the structure exceeds a certain critical value. When the loading reaches the critical value, the structure will become unstable or buckle. A feature of buckling is that there exists more than one mode. The structure can buckle in different directions or different modes. Sometimes the structure experiences local buckling in different forms of wrinkles or corrugations. In real world, the structure usually buckles in a direction determined by initial imperfections of the structure instead of an arbitrary direction that theoretical solution predicts. The numerical simulation of the structural buckling in FEA software at times reflects the existence of more than one valid buckling mode and different initial imperfections—depending on the digital computer and the operating system, a tiny difference in the floating point number may result in the buckling of structure in different directions. Different bifurcations may also be triggered by, but not due to, design variable changes. In general a design variable change will cause a change in the results and potentially cause the computational algorithms to follow a different bifurcation. For very complicated, highly non-linear problems such as car crash simulation, the chances of having a different bifurcation are significant. It is therefore difficult to be sure whether a change in results is due to a change in the design variable values or different bifurcation.

There is no logical method to distinguish which FEA result is a likely candidate associated with bifurcation. It is therefore desirable to have a new method to distinguish these effects more efficiently and effectively.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention discloses a system, method and design and probabilistic analysis software product to distinguish effects due to bifurcation from effects due to design variables changes in finite element analysis.

In a structural design study, usually a set of experiments with different design variables values are analyzed with the underlying FEA software. After the set of FEA results that correspond to the experiments are obtained, engineers will then construct a metamodel such as response surface based on a least squares fitting technique using these FEA results. The metamodel can be based on any component of structural responses (e.g., nodal displacement, acceleration time history, etc.). From the constructed metamodel, the responses of all other combination of design variables can be predicted.

Because the metamodel predicts the average expected responses, the FEA results are in general scattered but clustered in the vicinity of the predicted results of the metamodel. However, when the bifurcation exists in FEA responses, the metamodel may not be able to predict those responses since there are more than one valid mode. According to one aspect of the present invention, the FEA results of the design experiments that are not predicted by the metamodel are classified as outliers. Outliers are the likely candidates that may have bifurcation (e.g., buckling) in the structural response.

This is a huge improvement over all of the old techniques of guessing which experiment may have bifurcation. For example, one technique referred as Monte Carlo simulation. A randomly selected set of design experiments are used. The corresponding FEA results are a cluster of cloud centered about a mean position. There is no way to distinguish which case in the cloud has a bifurcation.

To further verify the effects due to bifurcation, the outliers and the corresponding standard deviations are computed for every node or element in the FEA model and the standard deviation of the outliers are plotted on a finite element analysis mesh model. The region having a substantially higher standard deviation comparing to the overall structure usually indicates bifurcation. These unstable regions can also be identified using a different measure of the outliers such as the range—the difference between the maximum and minimum value. An engineer can then compare the FEA response of two extreme experiments such as the maximum and minimum outlier to verify the occurrence of the bifurcation.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 6 shows a comparison between two different buckling modes.

DETAILED DESCRIPTION OF THE PREFERRED EMBODIMENTS

Figure 1:
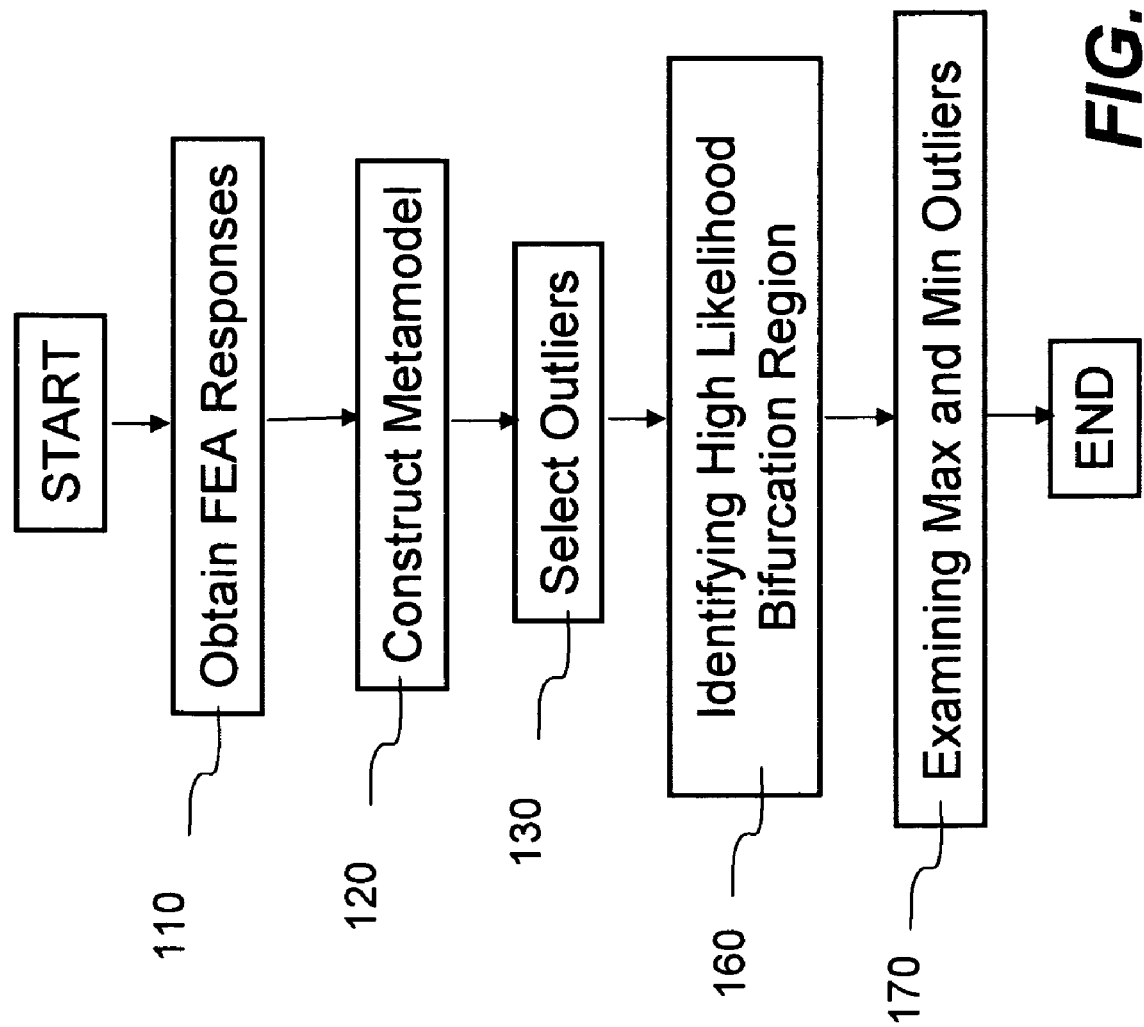
FIG. 1 is a flow chart of the present invention.

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

FEA stands for Finite Element Analysis.

Design variable is defined as any quantity or choice directly under the control of the designer. In structural design, plate thickness, loading direction, dimension of a components are the exemplary design variables.

Design experiment is defined as a structural configuration with specific combination of design variables. It usually denotes the specific combination as follows: $X=<X_1, X_2 \ldots X_n>$.

Bifurcation is defined as a solution splitting into two or more valid solutions.

Buckling is a structure failure due to instability. Buckling is a well known bifurcation in structural mechanics.

Metamodel is an approximation to the behavior of a model such as FEA model. It may be derived from a number of techniques such as least squares fitting, Taylor series expansion, neural net, Kriging approximations, etc. The present invention uses least squares fitting to create a metamodel or a response surface.

Response Surface and Metamodel are interchangeable in the present invention.

Outlier is defined as an observation whose value differs from the value expected or predicted for the specific combination of design variable values (i.e., a specific design experiment). The expected or predicted value of the observation is computed using a metamodel. The actual value of the observation is computed using FEA software.

FEA solutions and FEA responses are interchangeable.

Standard deviation is the standard statistical term used to represent the dispersion of the sample.

Range is the difference between the maximum and minimum value of a FEA response of an outlier.

Embodiments of the present invention are discussed herein with reference to FIGS. 1-7. However, those skilled in the art will readily appreciate that the detailed description given herein with respect to these figures is for explanatory purposes as the invention extends beyond these limited embodiments.

Referring now to the drawings, FIG. 1 shows a flow chart for the present invention. At 110, a plurality of finite element analyses (FEA) is conducted for a plurality of structural design experiments each with a specific combination of design variables values (e.g., a set of different car crash simulations with different crash angles, a set of different wall thickness of a tubular column). At 120, a plurality of metamodels is constructed using the FEA solutions obtained in 110. Any FEA solution components can be used to construct a metamodel. In one embodiment, the metamodels are based on the nodal displacement. In another embodiment, the metamodels are based on the acceleration time history. The metamodel constructed with the least squares fitting technique is called a response surface. At 130, the outliers are identified. The FEA solutions that are not expected or predicted by the metamodel are classified as outliers. Outliers are the high likelihood candidates for bifurcation. Finally, one can verify the bifurcation by examining the FEA solutions. In one embodiment, two following tasks are performed to verify the existence of bifurcation in a FEA solution: 1) identify the region having high standard deviation has the higher likelihood of solution bifurcation by plotting the indicating quantity of the FEA responses of the outliers on a FEA model mesh at 160; 2) examine the FEA solution for the maximum and the minimum outlier—the bifurcation can be identified easily with the FEA solutions of two extreme cases at 170. In one embodiment, the indicating quantity may be the standard deviation. In another embodiment the indicating quantity is the range.

Figure 2:
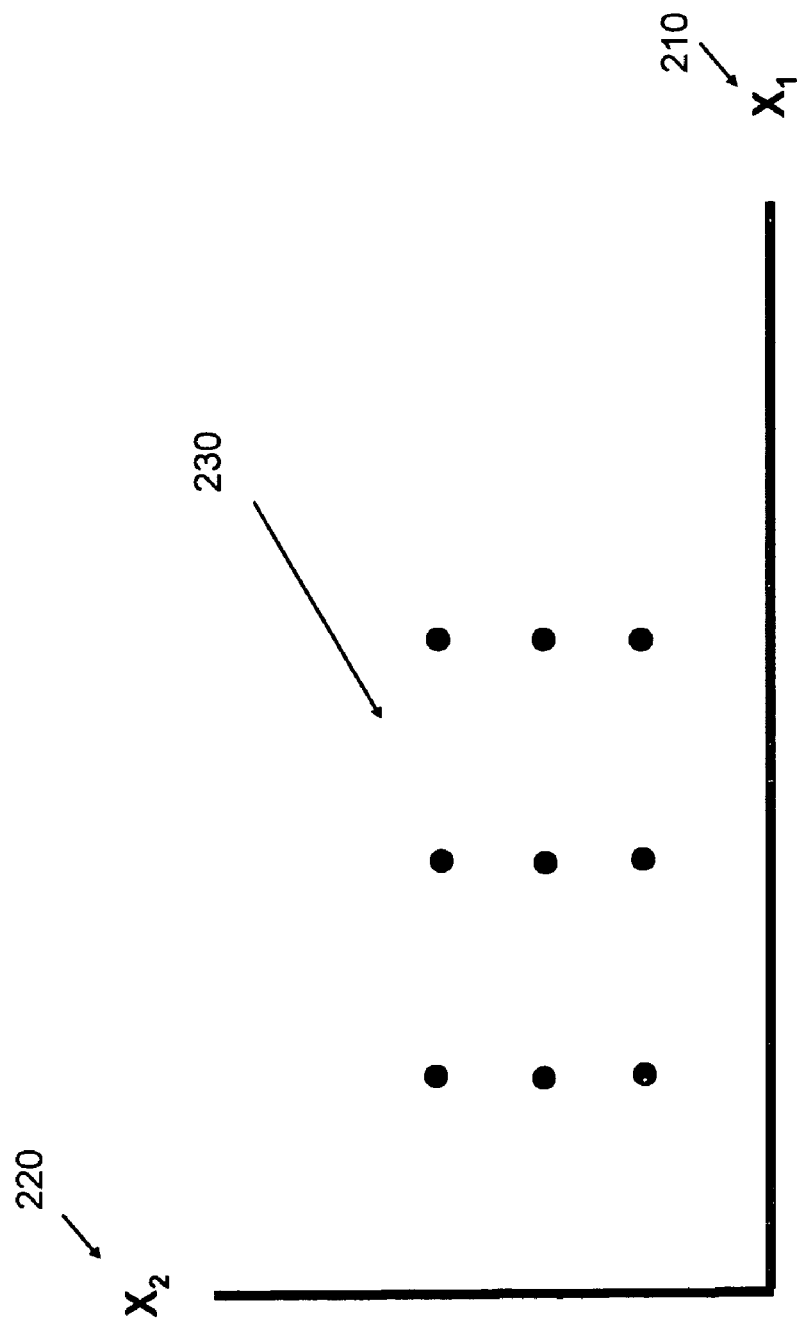
FIG. 2 shows an exemplary plot of experiments with two design variables.

FIG. 2 shows an exemplary plot of a plurality of design experiments 230 basing on two design variables, $X_1$ 210 and $X_2$ 220. Each design experiment 230 has a specific combination of design variables $X=<X_1,X_2>$ in this case. There is no limit on the number of the design variables. The general form of design variable is as follows: $X=<X_1, X_2, \ldots X_n>$. The finite element analysis (FEA) is conducted for each of all design experiments 230. The corresponding FEA responses obtained from a plurality of design experiments are plotted in FIG. 3. The exemplary X-Y plot has a vertical axis 360 to represent the FEA responses and a horizontal axis 370 representing a design variable value. In one embodiment, the FEA response may be one of the six components of the nodal displacement. In another embodiment, the FEA responses may be acceleration time history.

Figure 3:
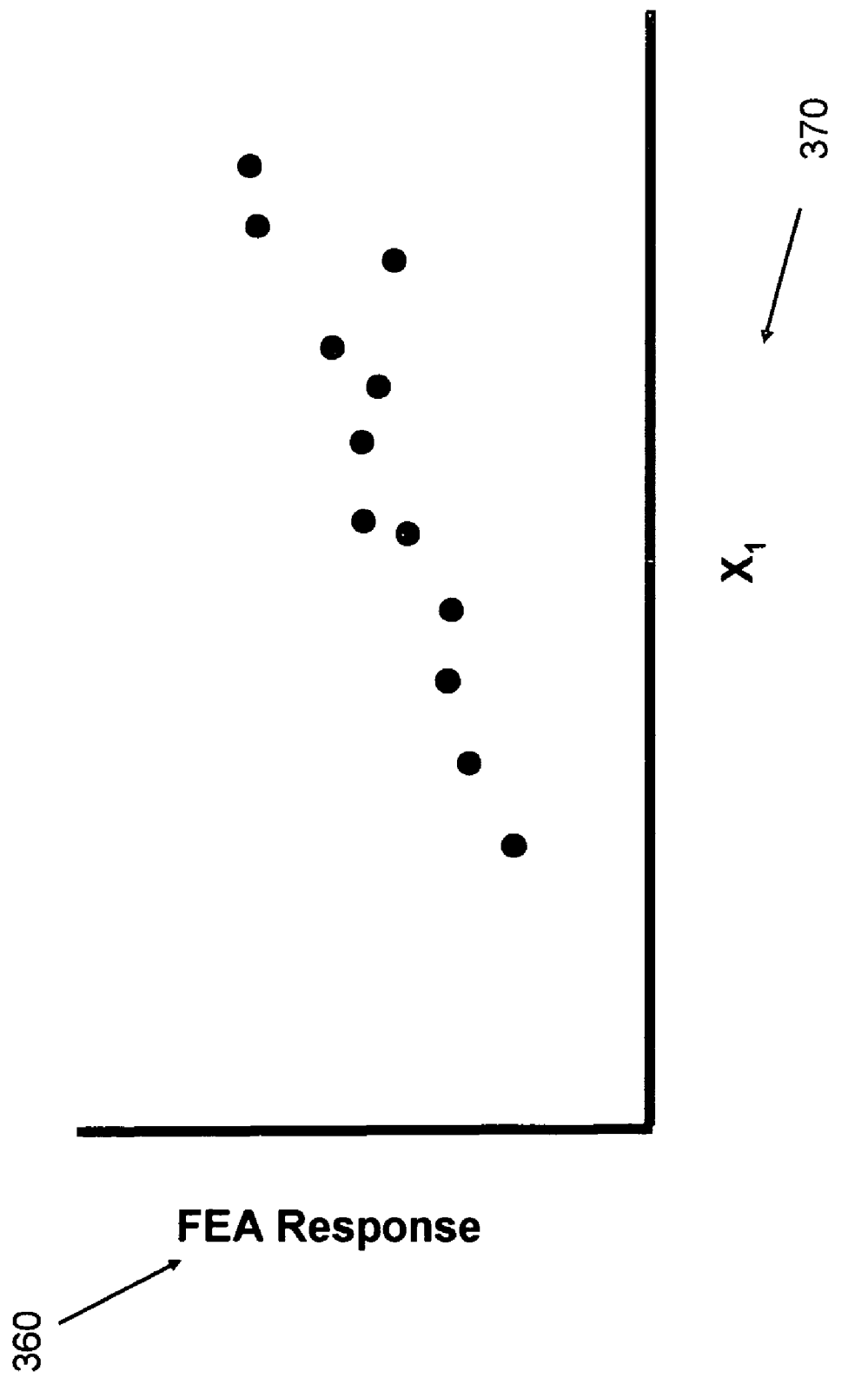
FIG. 3 shows the exemplary plot of FEA responses versus design variables.
Figure 4:
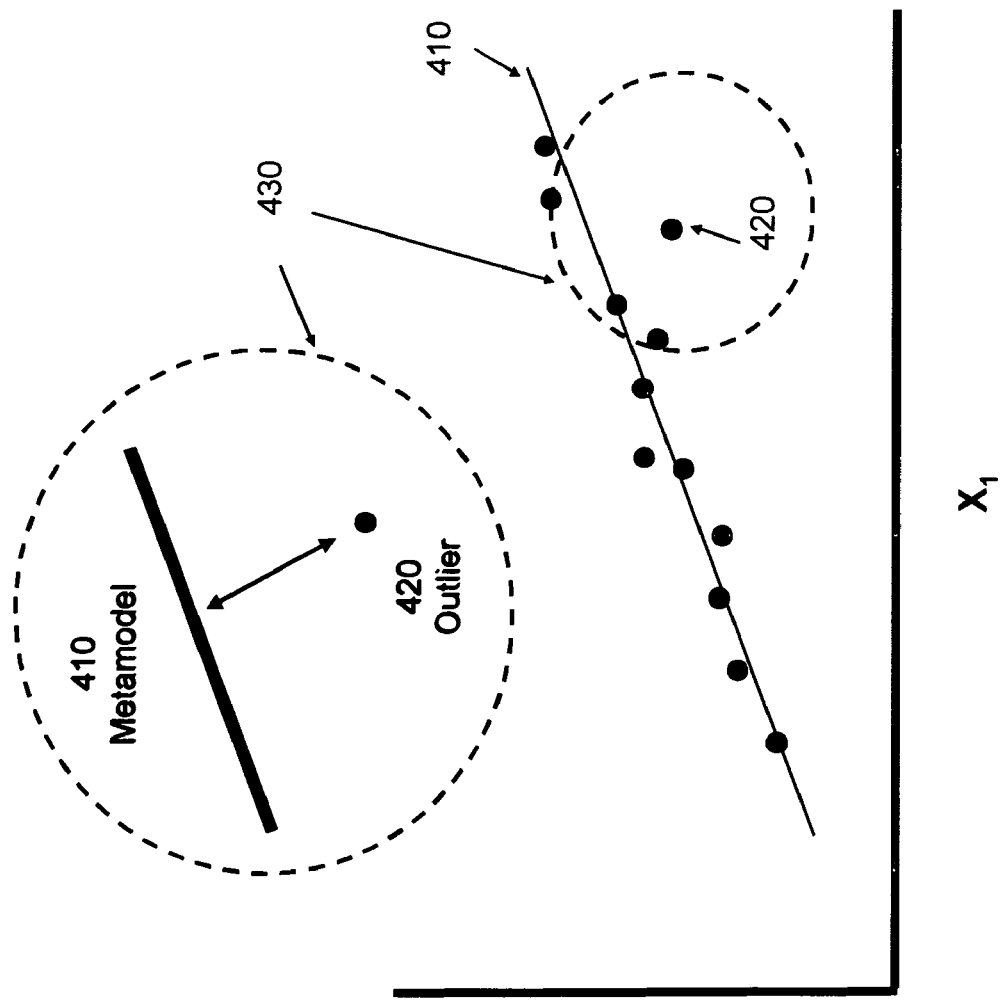
FIG. 4 shows the relationship between metamodel and outliers in one plot.
Figure 5:
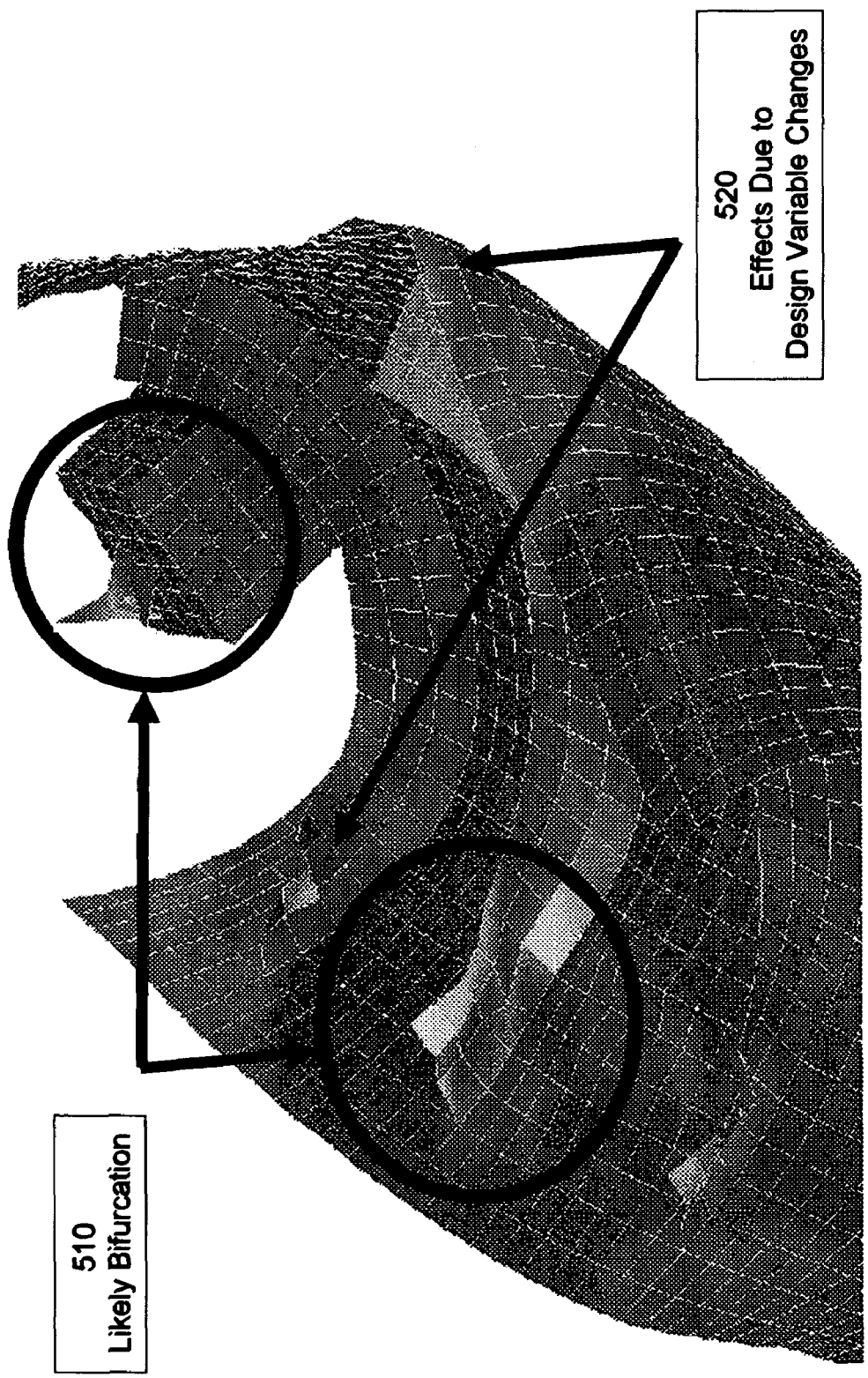
FIG. 5 illustrates an exemplary nodal displacement plot of standard deviation of outliers.

Referring now to FIG. 4, the metamodel 410 and outliers 420 are illustrated and superimposed on the exemplary X-Y plot in FIG. 3. The enlarged circle 430 shows that outliers 420 are those design experiments whose value are not predicted by the metamodel 410. In one embodiment, the metamodel is called a response surface which is constructed using the least squares fitting technique. The metamodel is used to approximate average expected FEA responses. Depending on which FEA responses of interest, the metamodel may be nodal displacement or acceleration time history. The FEA responses of outliers are far away from the expected value predicted by the metamodel; therefore outliers are the high likelihood candidates for bifurcation.

One can plot an indicating quantity of the FEA responses of outliers to identify the region of bifurcation. The indicating quantity may be standard deviation of particular FEA responses of the outliers in one embodiment. In another embodiment, the range of particular FEA responses may be the quantity. We now refer to FIG. 5, which shows a nodal displacement plot of standard deviation of outliers on a three dimensional FEA mesh model. The region 510 shows high standard deviation indicating high likelihood of bifurcation, while the region 520 shows the responses are due to design variable changes because the standard deviation is in a normal range.

Engineers may examine the FEA results of two extreme cases to verify the bifurcation. To show an exemplary maximum outlier, we now refer back to FIG. 4. The FEA response at 420 is a maximum outlier in this case. The minimum outlier is one of the responses on the metamodel 410. To further illustrate the different buckling modes for two extreme cases, FIG. 6 shows one buckling mode in maximum outlier 610 and another one in minimum outlier 620.

Figure 7:
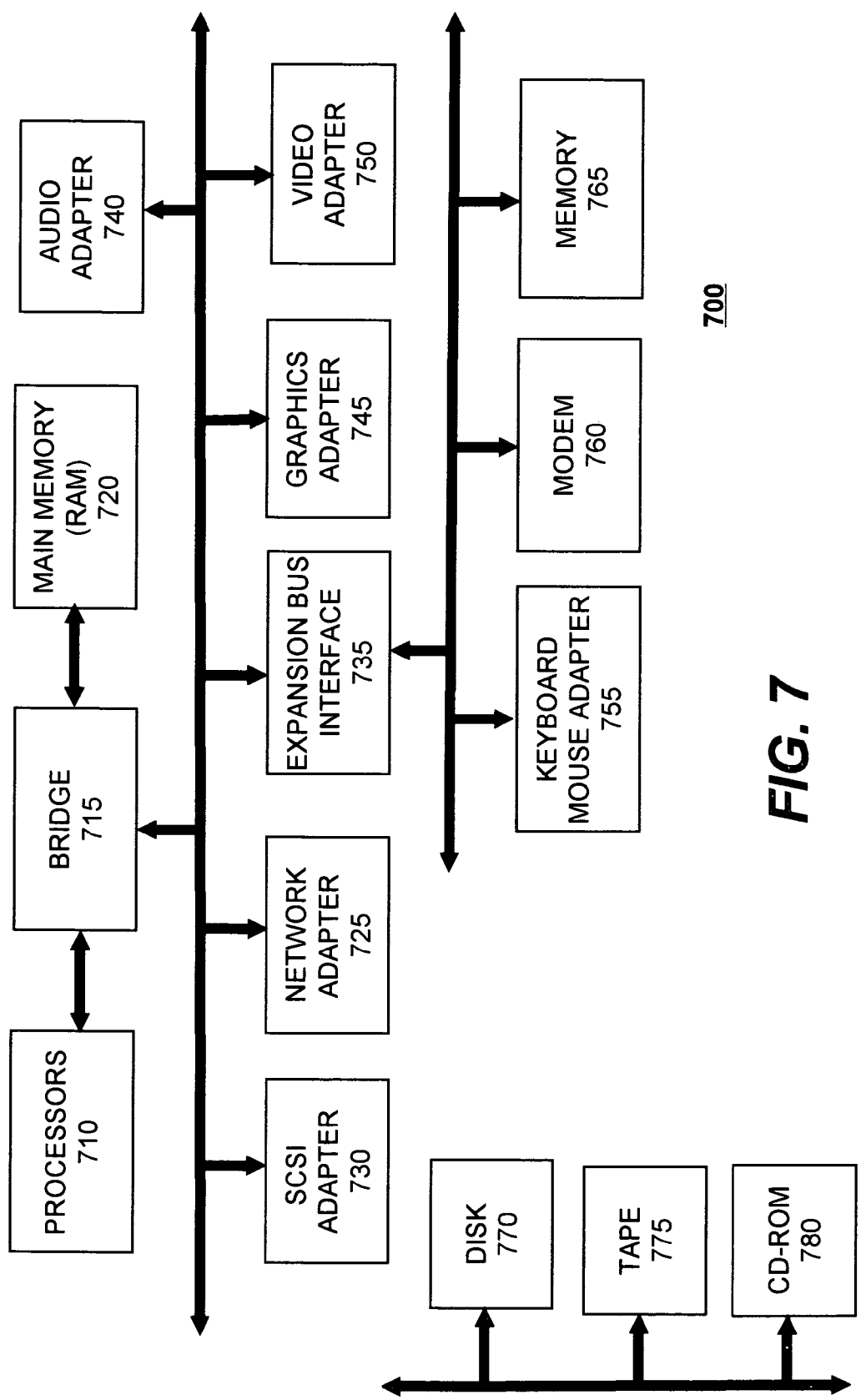
FIG. 7 depicts a block diagram of an exemplary computer, in which the present invention may be implemented.

With reference now to FIG. 7, a block diagram illustrates a computing device 700 in which the present invention may be implemented, and in which code or instructions implementing the processes of the present invention may be located. The exemplary computer system in FIG. 7 is discussed only for descriptive purposes. It should not be considered a limitation of the invention. Although the following descriptions related to a particular computer system, the concepts apply equally to other computer systems that are dissimilar to that shown in FIG. 7.

Computer system 700 includes at least one processor 710 and main random access memory (RAM) 720 connecting to a local bus 705 through a bridge 715. Additional connections to local bus 705 may be made through direct component interconnection or through add-in boards. In the depicted example, network adapter 725, small computer system interface (SCSI) adapter 730, and expansion bus interface 735 are directly connected to local bus 705. In contrast, audio adapter 740, graphics adapter 745, and video adapter 750 are connected to local bus 705 by add-in boards inserted into expansion slots. Expansion bus interface 735 provides a connection for a keyboard and mouse adapter 755, modem 760, and additional memory 765. SCSI adapter 730 provides a connection for hard disk drive 770, tape drive 775, and CD-ROM drive 780.

In order to communicate with other computer systems via a network, the computer system 700 connects to the network via network adapter 725. The network, Internet or intranet, connects multiple network devices utilizing general purpose communication lines.

Those of ordinary skill in the art will appreciate that the hardware shown in FIG. 7 may vary depending on the implementation. Other internal hardware or peripheral devices, such as flash ROM (or equivalent nonvolatile memory) or optical disk drives and the like, may be used in addition to or in lieu of the hardware depicted in FIG. 7. Also, the processes of the present invention may be applied to a multiprocessor computer system. In general, Computer system 700 is controlled and coordinated by operating system (OS) software, which performs tasks such as process scheduling, memory management, networking and I/O services. Exemplary OS includes Linux™, Microsoft Windows™.

Although an exemplary embodiment of invention has been disclosed, it will be apparent to those skilled in the art that various changes and modifications may be made to achieve the advantage of the invention. It will be obvious to those skilled in the art that some components may be substituted with another component providing same function. The appended claims cover the present invention.

I claim:

1. A method for distinguishing effects due to bifurcation from effects due to design variable changes used in a finite element analysis (FEA) for designing a structural product by a user of the FEA, the method comprising:

obtaining in a computing device a plurality of finite element analysis responses for a set of design experiments, wherein each of the set of design experiments has a specific combination of design variables values;

constructing a metamodel from the plurality of finite element analysis responses;

selecting a set of outliers from the set of design experiments whose finite element analysis responses are not predicted by the metamodel;

identifying high likelihood bifurcation region of a FEA model that represents the structural product by plotting an indicating quantity of the finite element analysis responses; and examining the finite element analysis responses of a couple of the outliers to determine whether the effects are due to the bifurcation or due to the design variable changes, wherein the couple of the outliers is maximum and minimum of the set of outliers.

2. The method as recited in claim 1, wherein the metamodel is constructed using least squares fitting technique.

3. The method as recited in claim 1, wherein the metamodel is based on nodal displacement.

4. The method as recited in claim 1, wherein the metamodel is based on acceleration history.

5. The method as recited in claim 1, wherein the indicating quantity is chosen from the group consisting of standard deviation and range.

6. A computer program product including usable medium having computer readable code embodied in the medium for causing an application module to execute on a computer for distinguishing effects due to bifurcation from effects due to design variable changes used in a finite element analysis (FEA) for designing a structural product by a user of the FEA, the computer program product comprising:

program code for obtaining a plurality of finite element analysis responses for a set of design experiments, wherein each of the set of design experiments has a specific combination of design variables values;

program code for constructing a metamodel from the plurality of finite element analysis responses;

program code for selecting a set of outliers from the set of design experiments whose finite element analysis responses are not predicted by the metamodel;

program code for identifying high likelihood bifurcation region of a FEA model that represents the structural product by plotting an indicating quantity of the finite element analysis responses; and program code for examining the finite element analysis responses of a couple of the outliers to determine whether the effects are due to the bifurcation or due to the design variable changes, wherein the couple of the outliers is maximum and minimum of the set of outliers.

7. The computer program product as recited in claim 6, wherein the metamodel is constructed using least squares fitting technique.

8. The computer program product as recited in claim 6, wherein the metamodel is based on nodal displacement.

9. The computer program product as recited in claim 6, wherein the metamodel is based on acceleration history.

10. The computer program product as recited in claim 6, wherein the indicating quantity is chosen from the group consisting of standard deviation and range.

11. A system for distinguishing effects due to bifurcation from effects due to design variable changes used in a finite element analysis (FEA) for designing a structural product by a user of the FEA, the system comprising:

an I/O interface;

a communication interface;

a secondary memory;

a main memory for storing computer readable code for an application module; at least one processor coupled to the main memory, the secondary memory, the I/O interface, and the communication interface, said at least one processor executing the computer readable code in the main memory to cause the application module to perform operations of:

obtaining a plurality of finite element analysis responses for a set of design experiments, wherein each of the set of design experiments has a specific combination of design variables values;

constructing a metamodel from the plurality of finite element analysis responses;

selecting a set of outliers from the set of design experiments whose finite element analysis responses are not predicted by the metamodel;

identifying high likelihood bifurcation region of a FEA model that represents the structural product by plotting an indicating quantity of the finite element analysis responses; and examining the finite element analysis responses of a couple of the outliers to determine whether the effects are due to the bifurcation or due to the design variable changes, wherein the couple of the outliers is maximum and minimum of the set of outliers.

* * * * *